United States Patent [19]

Penner

[11] Patent Number: 4,886,409
[45] Date of Patent: Dec. 12, 1989

[54] BIG BALE UNROLLER

[75] Inventor: Jacob Penner, Winnipeg, Canada

[73] Assignee: Inland Steel & Forgings Ltd., Winnipeg, Canada

[21] Appl. No.: 284,178

[22] Filed: Dec. 14, 1988

[30] Foreign Application Priority Data

Feb. 10, 1988 [CA] Canada .................................. 558622

[51] Int. Cl.⁴ .......................................... A01D 87/12
[52] U.S. Cl. ................................ 414/24.6; 242/86.52
[58] Field of Search ...................... 414/24.5, 24.6, 911, 414/607; 242/86.5 R, 86.52, 65

[56] References Cited

U.S. PATENT DOCUMENTS

| | | |
|---|---|---|
| 3,968,940 | 7/1976 | Godbersen . |
| 4,026,487 | 5/1977 | Ales, Jr. ................................. 242/65 |
| 4,084,707 | 4/1978 | McFarland . |
| 4,266,899 | 5/1981 | Skeem ................................ 414/24.6 |
| 4,441,845 | 4/1984 | Gibson ............................... 414/24.6 |
| 4,573,846 | 3/1986 | Willbanks et al. . |
| 4,583,900 | 4/1986 | Cooley . |
| 4,648,769 | 3/1987 | Stirling ............................. 414/24.6 |

FOREIGN PATENT DOCUMENTS

| | | | |
|---|---|---|---|
| 1039222 | 9/1978 | Canada . | |
| 2836246 | 3/1980 | Fed. Rep. of Germany | 414/24.6 |
| 3337390 | 5/1985 | Fed. Rep. of Germany | 414/24.6 |
| 2513484 | 4/1983 | France | 414/24.6 |
| 1326522 | 7/1987 | U.S.S.R. | 242/65 |

Primary Examiner—Frank E. Werner
Assistant Examiner—James T. Eller, Jr.
Attorney, Agent, or Firm—Murray E. Thrift; Stanley G. Ade; Adrian D. Battison

[57] ABSTRACT

A round bale transporter and unroller provides a mechanical system for unrolling large, round bales. The apparatus includes a frame that may be mounted on a front end loader. The mounting brackets are adjustable and "universal". A carriage is mounted on the frame for movement from side to side. The carriage carries a bale support in the form of a large disk with a long center spike and four smaller spikes distributed around it. The support is mounted on a shaft for rotation by a hydraulic motor also carried on the carriage. The unrolling mechanism is positioned at one side of the frame and projects to the front so that it lies alongside a bale carried by the support mechanism. The unroller includes a power driven, spiked cylinder that rotates in the same direction as the bale to draw material from the bale over the cylinder. As material is removed from the bale, the carriage is shifted towards the unroller.

14 Claims, 5 Drawing Sheets

BIG BALE UNROLLER

FIELD OF THE INVENTION

The present invention relates to an apparatus for handling large round bales of hay or straw and more particularly to an apparatus capable of lifting, transporting and unrolling such bales.

BACKGROUND

Attempts have been made in the past to provide devices that can handle large, round hay bales. Included in these are devices such as those described in U.S. Pat. Nos. 4084707 and 4573846 in which the bale is impaled on a series of spikes which are then rotated to unroll the bale. In the device described in Canadian Pat. No. 1,039,222, the bale is rotated and a cutter bar is advanced into the bale to chop the outer layer of hay. It is preferred, however, to unroll the hay rather than to cut it. Also known is the apparatus of U.S. Pat. No. 3968940, where the bale is supported on two hubs, one at each end, and a friction roller supports and rotates the bale from the side to cause its unrolling. Such devices rely on friction or gravity for the unrolling action and are in consequence lacking in speed and reliability.

The objective of the present invention is to provide an improved bale handling and unrolling device that is susceptible to greater control of the unrolling process.

SUMMARY

According to the present invention there is provided a round bale unroller comprising:

a bale support means for engaging a bale and supporting it above the ground;

first drive means for rotating the bale support means about a longitudinal axis of the bale;

an unroller including a cylinder positioned to one side of the bale support means. substantially parallel to the bale axis:

second drive means for rotating the unroller cylinder in the same direction as the rotation of the bale support means; and bale shifting means for moving the bale support means towards the unroller cylinder to keep the bale in contact therewith.

With both the bale and the unroller cylinder positively driven, the bale is positively unrolled under controlled conditions. The use of a separate powered translating mechanism for keeping the bale in contact with the unroller cylinder provides an added degree of control of the unrolling process.

With an apparatus according to the invention mounted on a front end loader, the operator can view the unrolling operation and the direction of motion simultaneously. The discharge of the materials is preferably directed to one side so that the feed can be placed in an area inaccessible to the tractor. The material can be either piled or windrowed at the choice of the operator.

BRIEF DESCRIPTION OF THE DRAWINGS

In the accompanying drawings, which illustrate an exemplary embodiment of the present invention.

DETAILED DESCRIPTION

Figure 1:
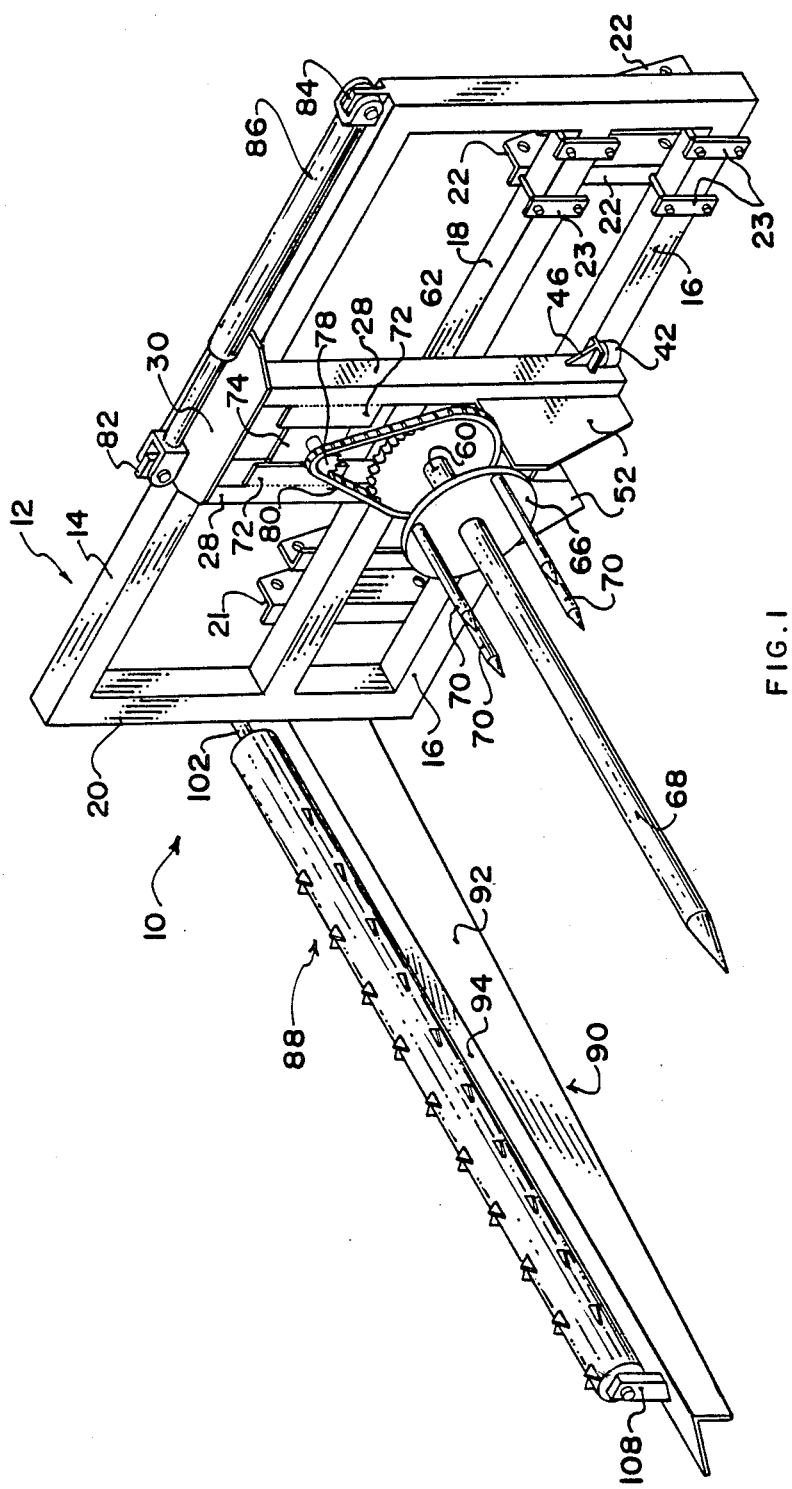
FIG. 1 is an isometric view of an unloader according to the present invention.
Figure 2:
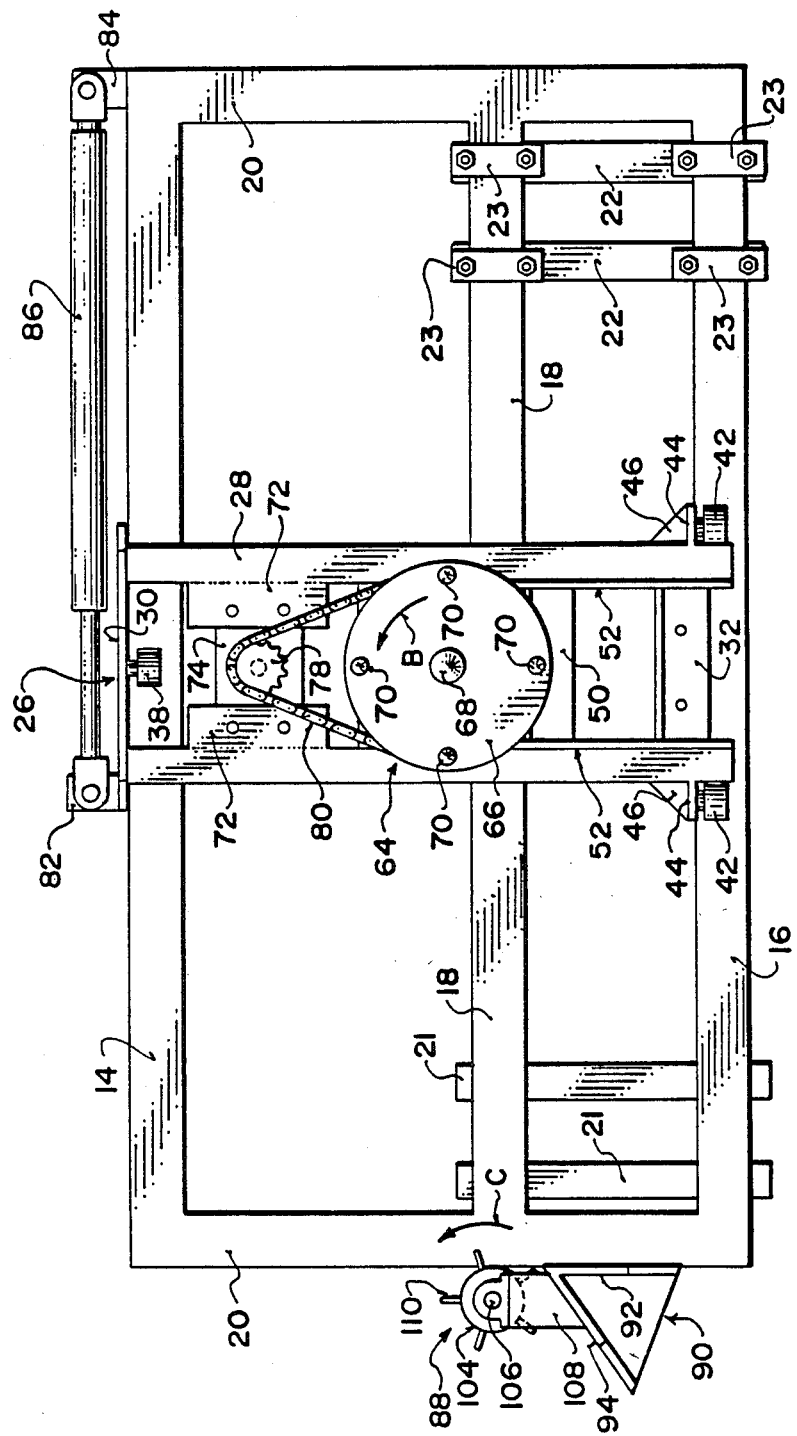
FIG. 2 is a front elevation of the unloader.
Figure 3:
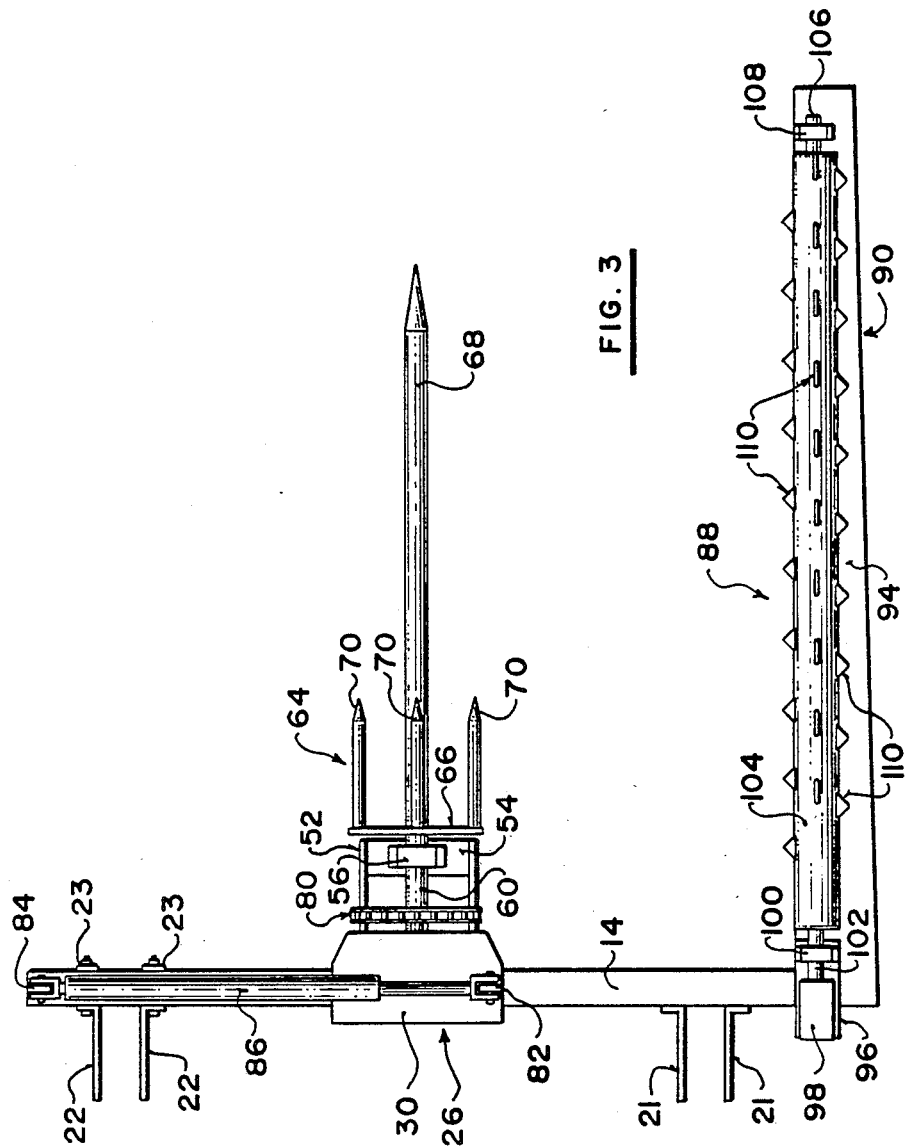
FIG. 3 is a plan view of the unloader.

Referring to the accompanying drawings, there is illustrated a round bale handling apparatus 10. The apparatus includes a main frame 12 composed of an upper cross bar 14, a lower cross bar 16 and a center cross bar 18 all connected by vertical side bar 20. The lower and centre cross bars 16 and 18 respectively carry two brackets 22 that are adjustably mounted on the cross bars by clamps 23, and two fixed brackets 21. The brackets 21 and 22 are provided with a number of mounting holes 24, as particularly illustrated in FIG. 4, so that they can be mounted directly on a front end loader. The adjustability of the brackets on the frame accommodates various loader widths and allows the desired positioning of the frame with respect to the tractor.

Figure 5:
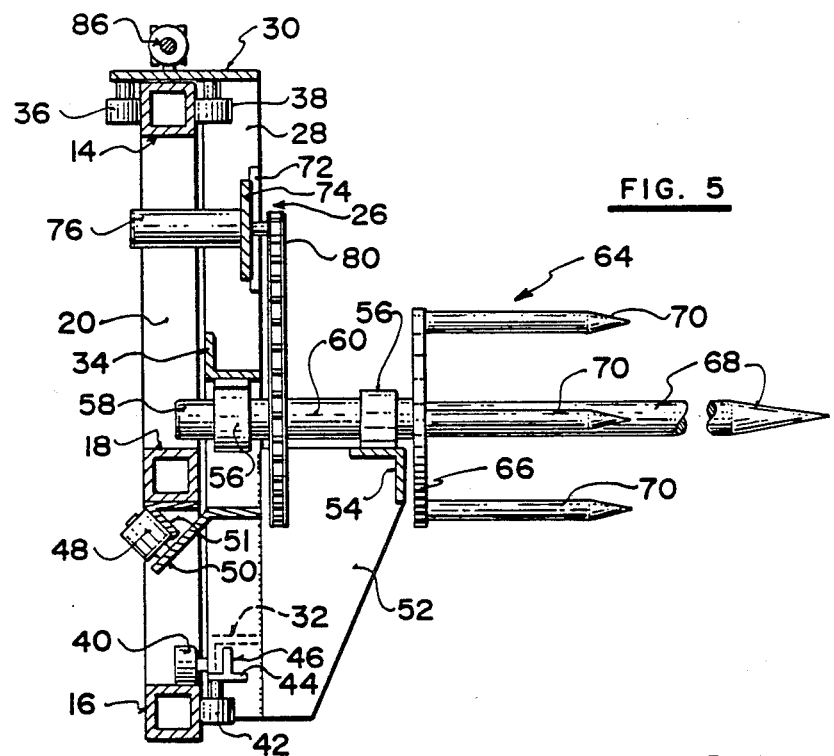
FIG. 5 is side elevation of the moveable carriage of the unloader, partly in section.

A movable carriage 26 is mounted on the frame 12 to travel laterally on the frame. The carriage consists of a two side bars 28 connected by a top plate 30, a bottom angle 32 and a centre angle 34, as most particularly illustrated in FIG. 5.

The carriage is retained on the frame by a series of rollers. These include two top rollers 36 mounted on the top plate 30 behind the upper crossbar 14 of the frame 12. These rollers are located at opposite ends of the top plate 30. A front roller 38 is mounted on the plate 30 at the centre between the side bars 28, to engage the front face of the upper cross bar 14. At the bottom of the carriage two rollers 40 are mounted on the bottom angle 32 and roll on the top face of the lower cross bar 16 of the frame. Two additional rollers 42 with vertical axes are mounted on flanges 44 on the sides of the carriage, at the bottom, to roll on the front face of the lower cross bar 16. The flanges 44 are reinforced by vertical braces 46. An additional roller 48 is mounted on a plate 50 that extends from the carriage to the rear and then down so that the roller 48 engages an angle 51 attached to the lower face of the centre cross bar 18.

The movable carriage 26 also includes a pair of side plates 52 that project from the side bars 28 to the front and are bridged by an angle 54 at their top, front corners.

A pillow block 56 is mounted on the angle 54 and a similar pillow block 56 is mounted on the center angle 34 of the carriage. These blocks are aligned to receive a shaft 60 that projects to the front of the carriage with the shaft 60 having a rear end 58 supported by the pillow block 56 mounted on the angle 34. A sprocket 62 of large diameter is mounted on the shaft 60 between the two pillow blocks, while a bale support unit 64 is mounted on the shaft. The bale support unit includes a circular base plate 66, and four small spikes 70 arranged symmetrically around the shaft 60. In front of the base plate 66, the shaft forms a large central spike 68.

Above the centre angle 34 and below the top plate 30. the carriage 26 has a pair of plates 72 projecting towards one another from the respective side bars 28. The plates 72 are bridged by a mounting plate 74 carrying a hydraulic motor 76 with its output shaft horizontal and projecting through the mounting plate to the front. The motor shaft carries a small sprocket 78 which is entrained by a chain 80 that also engages the large sprocket 62 mounted on the bale support shaft 60.

A lug 82 on the top plate 30 of the carriage 26, and a similar lug 84 at one side of the frame 12 are connected to the rod and cylinder respectively of an hydraulic cylinder 86 so that extension or retraction of the cylinder will cause the carriage 26 to travel laterally of the frame 12.

Figure 4:
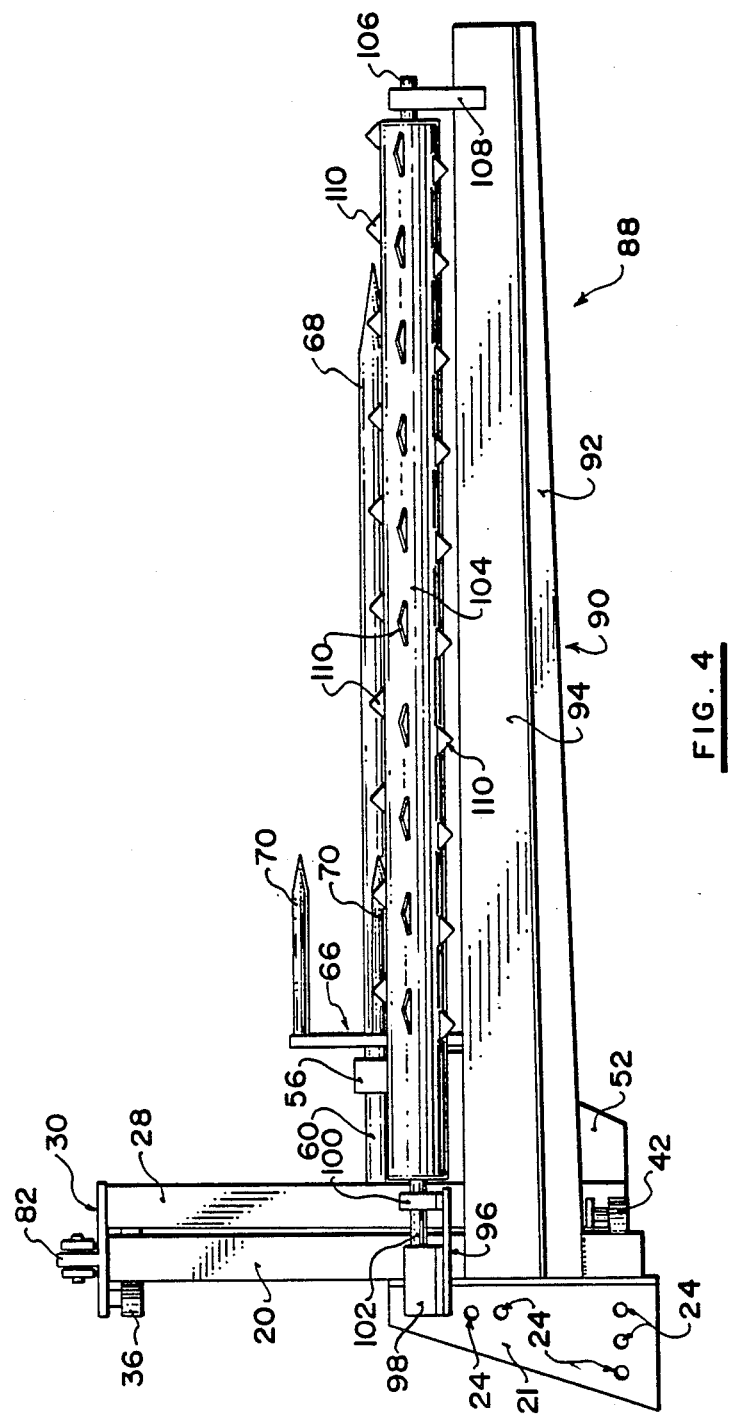
FIG. 4 is side elevation of the unloader.

At one side, the frame 12 carries an unroller mechanism 88. This includes a guide and support unit 90 consisting of a vertical flange 92 and an integral sloping guide plate or flange 94, sloping downwardly and outwardly from the top edge of the vertical flange 92. As illustrated in FIG. 4, a bracket 96 is secured to the same side of the frame 12 immediately above the back end of the guide plate. The bracket carries a hydraulic motor 98 and a bearing support 100. A shaft 102, supported in the bearing and driven by the hydraulic motor is connected to the rear end of a cylinder 104 that is spaced above the guide plate 94 and has a shaft 106 at its forward end supported by a bearing and support 108 mounted on the guide plate. Several triangular plate-like teeth 110 are distributed over the surface of the cylinder 104.

Figure 6:
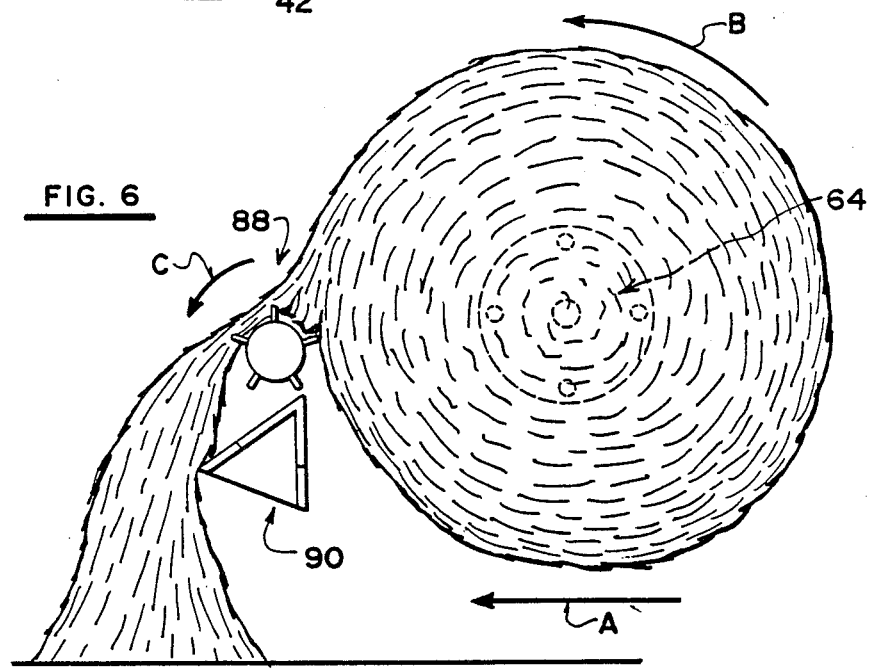
FIG. 6 is a pictorial representation of the unrolling process.

The operation of the apparatus is illustrated schematically in FIG. 6. The bale 112 is first impaled by the spikes 68 and 70 and then lifted using the front end loader. When the bale is off the ground, it can be transported to the desired feeding location. The ties holding the bale together are then removed. The two hydraulic motors are then actuated to rotate the bale in the direction of the arrow B and the unroller cylinder 104 in the direction of the arrow C. The hydraulic cylinder is actuated to move the bale in the direction of arrow A until it engages the cylinder 104. The cylinder 104 takes material from the bale and draws it over itself to be deposited on the ground beside the tractor. The material removed from the bale may be piled beside the tractor, or laid in a windrow simply by driving the tractor as the bale is being unrolled. As the diameter of the bale reduces, the hydraulic cylinder moves the bale towards the unroller as necessary to ensure that material continues to be removed from the bale.

The speed of the cylinder is under control of the operator, so that the amount of feed being taken from the bale from time to time may be varied. The material is removed from the bale by mechanical means so that the material removal is relatively rapid and reliable. The material removed by the apparatus is returned to approximately its original density so that it can easily be consumed by cattle. The material is not cut or otherwise damaged in removal so that feed value is not lost. The apparatus can handle circular bales of various diameters and lengths.

While one embodiment of the present has been described in the foregoing it is to be understood that other embodiments are possible within the scope of the present invention. The invention is to be construed as limited solely by the scope of the appended claims.

I claim:

1. A round bale unroller comprising:
 a bale support means for engaging a bale and supporting it above the ground;
 first drive means for rotating the bale support means about a longitudinal axis of the bale;
 an unroller including a cylinder positioned to one side of the bale support means, substantially parallel to the bale axis;
 second drive means for rotating the unroller cylinder in the same direction as the rotation of the bale support means: and
 bale shifting means for moving the bale support means towards the unroller cylinder to keep the bale in contact therewith.

2. An unroller according to claim 1 including a frame and a carriage mounted for lateral movement on the frame, the unroller cylinder being mounted on the frame and the bale support means being mounted on the carriage.

3. An unroller according to claim 2 wherein the frame is adapted to be mounted on a front end loader.

4. An unroller according to claim 2 wherein the bale support means comprise a base, a plurality of spikes projecting from the base and means mounting the base for rotation on the carriage.

5. An unroller according to claim 4 wherein the spikes include a large central spike and plural smaller spikes distributed thereabout.

6. An unroller according to claim 4 wherein the first drive means comprise a motor mounted on the carriage.

7. An unroller according to claim 6 wherein the first drive means comprises hydraulic motor.

8. An unroller according to claim 1 wherein the unroller includes a guide plate positioned adjacent and substantially parallel to the unroller cylinder.

9. An unroller according to claim 8 wherein the guide plate is positioned below the unroller cylinder and slopes downwardly away from the bale support means.

10. An unroller according to claim 9 wherein the unroller cylinder has a plurality of teeth projecting from its surface.

11. An unroller according to claim 10 wherein the second drive means comprise an hydraulic motor.

12. An unroller according to claim 2 wherein the bale shifting means comprise means joining the carriage and the frame for moving the carriage along the frame.

13. An unroller according to claim 12 wherein the bale shifting means comprise a hydraulic cylinder.

14. A round bale transporter and unroller comprising:
 a frame;
 means for mounting the frame on a front end loader so as to extend laterally across the front of the loader;
 a carriage mounted on the frame for lateral movement thereon;
 a bale support means mounted on the carriage and comprising bale impaling spikes mounted on a base and projecting forwardly from the carriage, and means mounting the base on the carriage for rotation about a longitudinal axis;
 bale unrolling means mounted on the frame to one side of the bale support means, including a cylinder with a plurality of teeth thereon mounted for rotation about an axis substantially parallel to the longitudinal axis, and a guide plate positioned below the cylinder:
 first drive means for rotating the bale support means around said longitudinal axis;
 second drive means for rotating the bale un roller cylinder in the same direction as the rotation of the bale support means; and
 bale shifting means joining the frame and carriage for moving the carriage laterally towards the unrolling means.

* * * * *